United States Patent [19]
Greene et al.

[11] Patent Number: 4,614,404
[45] Date of Patent: Sep. 30, 1986

[54] ELECTRICALLY AND MANUALLY OPERATED MIRROR

[76] Inventors: Laverne Greene; George Spector, both of 233 Broadway, RM 3615, New York, N.Y. 10007

[21] Appl. No.: 613,793

[22] Filed: May 24, 1984

[51] Int. Cl.[4] .................... B60R 1/04; G02B 17/00
[52] U.S. Cl. ........................... 350/280; 350/278
[58] Field of Search ................. 350/280 D, 278

[56] References Cited
U.S. PATENT DOCUMENTS
4,281,898 8/1981 Ochiai et al. .................. 350/278

FOREIGN PATENT DOCUMENTS
0000653 2/1979 European Pat. Off. ............ 350/280

*Primary Examiner*—John K. Corbin
*Assistant Examiner*—Rebecca D. Gass

[57] ABSTRACT

An electrically and manually controlled rear view mirror is provided and consists of a switch mounted within a motor vehicle that is manually operated by the driver causing a pivotable motion of the mirror between two predetermined operating positions to provide high and low brightness images.

5 Claims, 3 Drawing Figures

ELECTRICALLY AND MANUALLY OPERATED MIRROR

BACKGROUND OF THE INVENTION

The instant invention relates generally to rear view mirrors and more specifically it relates to an electrically controlled rear view mirror.

Numerous rear view mirrors have been provided in prior art that are adapted to be automatically adjusted. For example, U.S. Pat. Nos. 3,666,354; 4,078,859 and 4,281,898 all are illustrative of such prior art. While these units may be suitable for the particular purpose to which they address, they would not be suitable for the purposes of the present invention as heretofore described.

SUMMARY OF THE INVENTION

A principle object of the present invention is to provide an electrically controlled rear view mirror by a switch mounted within a motor vehicle that is manually operated by the driver.

Another object is to provide an electrically controlled rear view mirror whereby the switch causes a pivotable motion of the mirror between two predetermined operating positions to provide high and low brightness images.

An additional object is to provide an electrically controlled rear view mirror whereby one of the predetermined operating positions is manually adjustable.

A further object is to provide an electrically controlled rear view mirror that is simple and easy to use.

A still further object is to provide an electrically controlled rear view mirror that is economical in cost to manufacture.

Further objects of the invention will appear as the description proceeds.

To the accomplishement of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
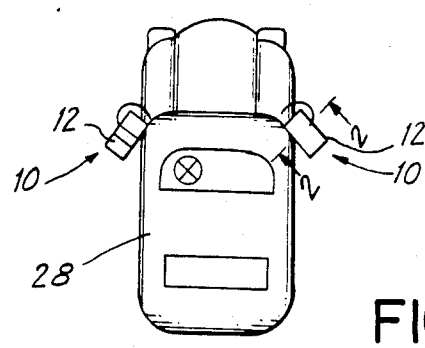
FIG. 1 is a top view of an auto showing the rear view mirrors on each side of the vehicle.
Figure 2:
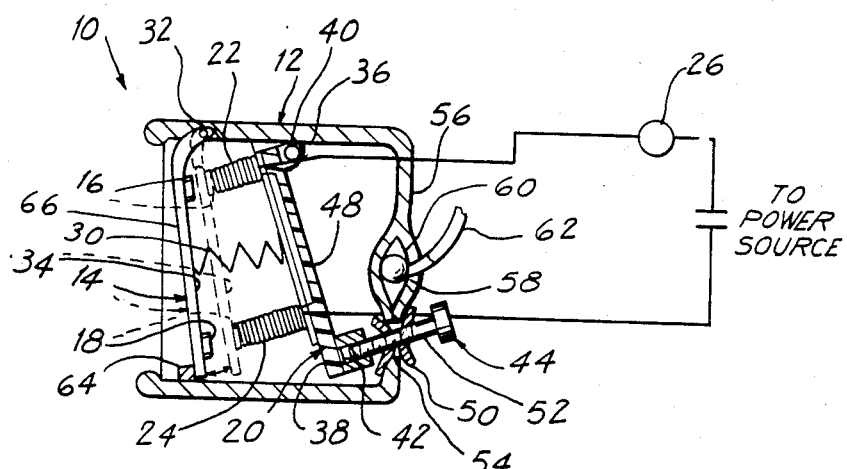
FIG. 2 is a cross section through section 2—2 of FIG. 1 showing the day and night time rear view mirror positions and the electric circuit for operating the mirror positions from a switch mounted in the vehicle.
Figure 3:
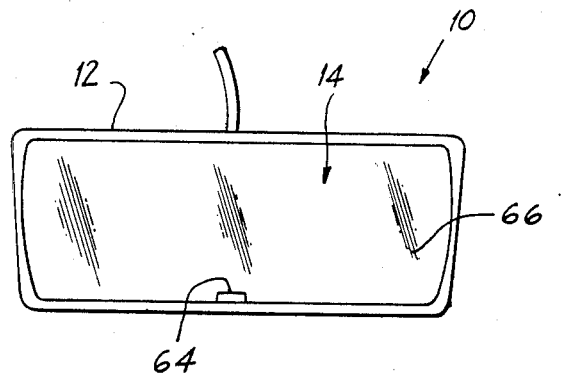
FIG. 3 is a front view of a mirror.

Turning now descriptively to the drawings, in which similar reference characters denote similar elements throughout the several views, FIGS. 1 through 3 illustrate an electrically and manually controlled rear view mirror 10 that consists of a housing 12, a mirror 14, a pair of permanent magnets 16, 18, an adjustable plate 20, a pair of solenoids 22, 24 and a switch 26.

The housing 12 is mounted to exterior of a motor vehicle 28. The housing 12 is designed to permit manual adjustment of its angular position with respect to driver's eyes.

The mirror 14 is spring biased at 30 and is supported by the housing 12 at 32 for pivotable motion between two predetermined operating positions to provide high and low brightness images. The permanent magnets 16 and 18 are secured to rear surface 34 of the mirror 14.

The adjustable plate 20 is supported by the housing 12 at 36. The solenoids 22 and 24 are secured to front surface 38 of the plate 20 in opposed relationship to the permanent magnets 16 and 18.

The switch 26 is mounted within the motor vehicle 28, such as the dashboard, and connected to energize the solenoids 22 and 24 by manual operation of the driver. The switch 26 causes the pivotable motion of the mirror 14 from one to the other of the operating positions by virtue of magnetic attraction between the permanent magnets 16, 18 and the solenoids 22, 24. The energization of the solenoids 22, 24 are required only for moving the mirror 14 to one of the operating positions.

The adjustable plate 20 further consists of a pin 40, a threaded boss 42 and a bolt 44. The pin 40 is attached to one end of the plate 20 and the housing 12 to allow for pivotable motion. The threaded boss 42 is attached transversely to rear surface 48 of the plate 20 at other end thereof.

The bolt 44 has a collar 50 affixed midway on its threaded shaft 52 with free end of the shaft 52 in engagement with the boss 42. The collar 50 is in rotatable engagement with an aperture 54 at rear 56 of the housing 12 so that the bolt 44 can be turned manually to adjust the position of the plate 20.

A ball 58 and socket 60 universal joint is formed in the rear wall 56 of the housing 12 and a mounting bracket 62 is attached to the ball 58 of the universal joint.

A stop cushion 64 made out of soft rubber or plastic is mounted to the housing 12 opposite the pivotable portion 32 of the mirror 14. The stop cushion 64 can engage front surface 66 of the mirror 14 when de-energization of the solenoids 22 and 24 by the switch 26 takes place allowing the spring biased mirror 14 to return to its original position.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An electrically and manually controlled rear view mirror which comprises:
   (a) a housing mounted to the exterior of a motor vehicle, said housing designed to permit manual adjustment of its angular position with respect to driver's eyes;
   (b) a mirror spring biased to a first position supported pivotally by the housing for pivotable motion between said first position and a predetermined second operating position to provide high and low brightness images;
   (c) an adjustable plate mounted on said housing spaced from said mirror;
   (d) magnetic means mounted on said mirror and plate for moving said mirror towards said plate towards said second position in opposition to said spring bias, said means including a solenoid and a coacting magnet; and (e) a switch mounted within the motor vehicle and connected to energize the solenoid by manual operation of the driver causing the pivotable motion of the mirror from one to the other of the operating positions by virtue of said magnetic means working in opposition to said spring bias.

2. An electrically and manually controlled rear view mirror as recited in claim 1, wherein mirror is biased by a spring mounted between said plate and mirror and said plate is pivotal at one end and has a manually adjustable opposite end.

3. A rear view mirror as in claim 2, further including:
(a) a pin attached to one end of the plate and the housing to allow for pivotable motion;
(b) a threaded boss attached transversely to rear surface of the plate at other end thereof; and
(c) a bolt having a collar fixed midway on its threaded shaft with free end of the shaft in engagement with the boss and the collar in rotatable engagement with an aperture at rear of the housing so that the bolt can be turned manually to adjust the position of the plate.

4. A rear view mirror as recited in claim 1, wherein the housing further comprises:
(a) a ball and socket universal joint formed in rear wall of the housing; and
(b) a mounting bracket attached to the ball of the universal joint.

5. A rear view mirror as recited in claim 2, wherein the housing further comprises a stop cushion mounted to the housing opposite the mirror front so that the stop cushion can engage front surface of the mirror when de-energization of the solenoid by the switch takes place allowing the spring biased mirror to return to its original position, said magnetic means comprising a pair of spaced magnets on the back of said mirror and a pair of spaced solenoids aligned with said magnets, said spring being disposed between said solenoids.

* * * * *